United States Patent [19]

Monty et al.

[11] Patent Number: 5,799,070
[45] Date of Patent: Aug. 25, 1998

[54] USER FRIENDLY INTERFACE FOR A FACSIMILE MACHINE INTEGRATING PROGRAMED DIALING AND MONITOR DIALING

[75] Inventors: Melissa L. Monty, Poway; Yuen-Yee Joanna Pang, San Diego, both of Calif.

[73] Assignee: Hewlett Packard Company, Palo Alto, Calif.

[21] Appl. No.: 811,553

[22] Filed: Mar. 4, 1997

[51] Int. Cl.$^6$ .................. H04M 11/00; H04N 1/00
[52] U.S. Cl. .................. 379/100.14; 379/355; 358/440
[58] Field of Search .................. 379/100.14, 100.01, 379/100.03–100.08, 100.17, 110.01, 93.26, 354–357; 358/400, 434–438, 440, 468, 442

[56] References Cited

U.S. PATENT DOCUMENTS

| | | | |
|---|---|---|---|
| 5,033,078 | 7/1991 | Andoh | 379/100.14 |
| 5,216,705 | 6/1993 | Yoshida et al. | 379/100.14 |

*Primary Examiner*—Wing F. Chan

[57] ABSTRACT

A facsimile machine which may be successfully operated by a user, using a dialing mode with which the user is already familiar. Programed dialing, monitor dialing, and speed dialing are integrated in a way that does not artificially constrain the user to only certain combinations of commands. Users who are dialing through a PBX or placing the call through a credit card company, may dial the call interactively using one or more string of numbers stored in memory along with numbers entered directly from the keypad, with the user receiving audible feedback in the form of dial tones, beeps and tones, and recorded verbal instructions. Various international dialing functions such as Mercury are stored and accessed in the same way the user would access other numbers stored in a speed dial or one-touch dial memory location. The various dialing modes and functions may be cascaded, whereby the user may access one speed dial number (or special function such as Mercury) and then continue to dial additional speed-dial numbers or digits from the front panel keypad. The number of buttons on the front panel is kept to a minimum, with multiple functions being assigned to a common button in optimal functional groupings whereby the user may readily locate, identify, and use all available functions, using a conventional keypad and two dedicated front panel buttons: "Start" and "Speed Dial", with appropriate messages being displayed on the front panel. In particular, the Start button is used both to cause the machine to go off-hook and to dial any previously speed dialing sequences, as well as to accept a displayed speed dial entry, while the Speed Dial button is used to invoke the speed dial function and to select between single and double digit entries and to scroll through successive entries.

10 Claims, 5 Drawing Sheets

USER FRIENDLY INTERFACE FOR A FACSIMILE MACHINE INTEGRATING PROGRAMED DIALING AND MONITOR DIALING

TECHNICAL FIELD

The present invention relates generally to facsimile machines and more specifically to an improved user interface for initiating outgoing facsimile transmissions.

BACKGROUND ART

"Programed dialing" is a typical fax dialing scheme that allows the user sending a fax to enter a telephone number (for example, using a keypad on a front panel of the fax machine) prior to going off-hook. The number is stored in a temporary memory cache ("dialing queue") as it is entered. When the user presses a "Start" button the fax will go off-hook (i.e., get a dial tone), generate the number tones (i.e., dial the number), and transmit the CNG (CalliNG) tone sequence identifying the transmission as coming from a facsimile machine. When the receiving fax answers with the CED (CallED) sequence and the fax communication is established, the sending fax will automatically scan the document in the ADF (Automatic Document Feeder) and send it. Since there is no audible feedback and no provision for manually changing, pausing, or adding to the preprogramed number sequence, users are frequently unsuccessful completing a call using programed dialing. Such incomplete calls are particularly a problem when the local exchange is experiencing a high traffic load and does not immediately generate a dial tone in response to the off-hook condition, or if the call requires a portion of the number sequence to be dialed only after an intervening telephone exchange has responded with a second dial tone or a series of user prompts.

"Monitor dialing" is another typical fax dialing scheme that allows the user sending a fax to take the fax off-hook (i.e., hear the dial tone) and dial the fax number as if they were dialing a standard telephone call (i.e., interactively with the telephone exchange). The audible feedback enables the user to recognize when it is appropriate to proceed with dialing.

Some known facsimile machines provide programed dialing as the primary mode of dialing and support monitor dialing as a secondary function, accessible via an "Enter" button or a dedicated "Monitor" button. When the dedicated Monitor button is pressed, the fax or attached telephone will go off-hook and the user can dial from the keypad or from memory. However, if the user initially operates one of the speed dial buttons of a machine having a dedicated Monitor button without first pressing that Monitor button (thereby initiating the programing mode), the user may not be able to switch to monitor dialing (and thus does not have any audible feedback), although it may be possible to dial additional numbers stored in memory or enter additional digits from the keypad.

Other facsimile machines support dialing more than one number from memory, but only if each of the numbers has been preprogramed as "chained" numbers, wherein all but the last of the relevant numbers designate the next number to be dialed.

In addition, the prior art includes at least three different schemes by which users make a fax call, each with its own unique sequence of the manual operations associated with loading the document into the scanner, entering the number, and commencing to transmit the fax.

Some known facsimile machines facilitate access to an alternative service provider such as Mercury (an alternate international service provider based in the UK) by providing a special button on the front panel to dial a special number from memory prior to dialing the telephone number. However such functions are not required for all markets and are inconvenient to use because the dialing functions are not grouped together.

Some known multi-function fax machines have a button for initiating Monitor mode fax dialing that is separate from the button for making copies. Other known multi-function machines use a combined button for going off-hook if already in the programmed dialing mode and for making a copy otherwise.

Accordingly, even sending a single page fax may be difficult for the user who is familiar with one dialing scheme and then is confronted with a new a fax machine that uses another scheme.

DISCLOSURE OF INVENTION

It is one overall objective of the present invention to provide a facsimile machine which may be successfully operated by a user, using a dialing mode with which the user is already familiar.

It is another overall objective to integrate programed dialing, monitor dialing, and speed dialing in a way that does not artificially constrain the user to only certain combinations of commands.

In accordance with one specific aspect of the invention, users who are dialing through a PBX or placing the call through a credit card company, may dial the call interactively using one or more string of numbers stored in memory along with numbers entered directly from the keypad, with the user receiving audible feedback in the form of dial tones, beeps and tones, and recorded verbal instructions.

In accordance with another specific aspect of the invention, various international dialing functions such as Mercury are stored and accessed in the same way the user would access other numbers stored in a speed dial or one-touch dial memory location.

In accordance with yet another aspect of the invention, the various dialing modes and functions may be cascaded, whereby the user may access one speed dial number (or special function such as Mercury) and then continue to dial additional speed-dial numbers or digits from the front panel keypad.

Preferably, the number of buttons on the front panel is kept to a minimum, with multiple functions being assigned to a common button in optimal functional groupings whereby the user may readily locate, identify, and use all available functions, using a conventional keypad and two dedicated front panel buttons: "Start" and "Speed Dial", with appropriate messages being displayed on the front panel.

PREFERRED MODE FOR PRACTICING THE INVENTION

Figure 1:
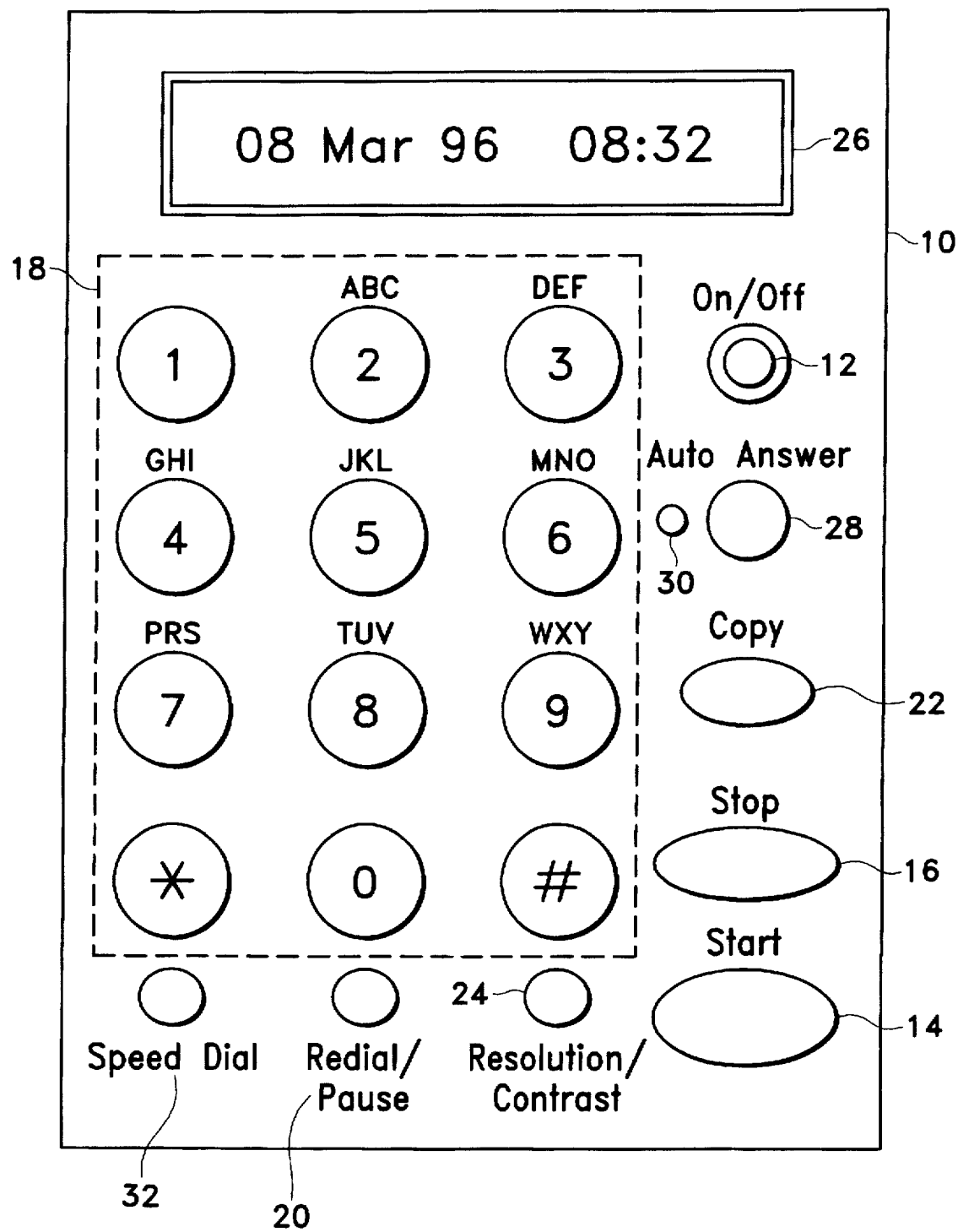
FIG. 1 shows the front panel of a preferred embodiment.

In the particular embodiment shown in FIG. 1, front panel 10 of the facsimile device includes various conventional elements such as a power switch 12, manual buttons for starting 14 and stopping 16 the device when operating in manual mode, and a standard keypad 18 with a redial/pause button 20, dedicated buttons for making copies 22 and for adjusting the resolution/contrast 24, as well as a time/date display 26 which can also be used for other alphanumeric display functions associated with whatever task is currently being performed, such as indicating the phone number of an outgoing call or the TSI (transmitting station identifier) associated with an incoming facsimile call, or otherwise detailing the status of the current task. The front panel 10 is also preferably provided with a unitary facsimile mode control in the form of an Auto Answer button 28 whose current status is indicated by an accompanying LED 30 and with a Speed Dial button 32, the specific function of which will be described in detail hereinafter with respect to FIG. 3.

In addition to use as a stand-alone facsimile and copy machine, it should be understood that the described preferred embodiment is also intended to be operated under the control of a personal computer (not shown), in which case the computer will control other functions not usually found in stand alone fax machines (such as scanning and printing) in addition to the functions typically required for stand-alone operation normally controlled by means of the front panel 10, as well as other user control functions (such as setting defaults and updating speed dialer directories) to which a casual user does not require access.

Referring still to FIG. 1, when the device is in the ready state and the user intends to send a fax by dialing from the front panel 10 using programed dialing, the user enters the number using the numeric keypad 18 and then presses the Start button 14. At this point the fax will go off-hook, dial the number, and start generating a sequence of sending fax "CNG" tones. The user will hear the dial tone and the number being dialed, and when the CallED fax answers and connects the user will hear the fax transaction (including the receiving fax "CED" tone sequence) and the document will then scan through the device and be transmitted. To send a fax using monitor dialing, the user presses the Start button 14, hears a dial tone, enters the phone number from the numeric keypad 18 and hears each tone as the respective button is pressed. When the number is dialed, the user will hear the phone ring and the resulting communication with the receiving fax. When the fax connection is established, the document will automatically scan through the device and be transmitted. In either mode, the user may either insert the document in the machine before the number is dialed, or may wait until the machine is ready to scan the document.

To send a fax using numbers in memory, the user may press the Speed dial 32 button and enter a one or two digit code and press Start 14, at which time the fax will go off-hook and start dialing the number and the communication will proceed as described above. If more numbers are required to complete the call, the user may again press the Speed Dial button 32, enter a code, and press Start 14 which will cause the digits stored in the corresponding memory location to be dialed. The user may also dial additional digits from the keypad 18 directly and (since the fax is already in the off-hook Monitor mode) the numbers will be dialed as the keys are pressed. Broadcast to a designated group of receiving fax numbers is also possible, provided the group has been previously stored in memory.

The Start button 14 also serves to support the user when answering fax calls manually, when completing certain dialogs initiated from the front panel 10 (such as copying a document in which the user presses the copy button, specifies the number of copies by pressing one or two number keys on the numeric keypad 18, and presses "Start" 14 to complete the dialog and initiate the copy job), and when resuming a print job after the device ran out of paper and the user loaded new paper in the sheet feeder (ADF).

Figure 2:
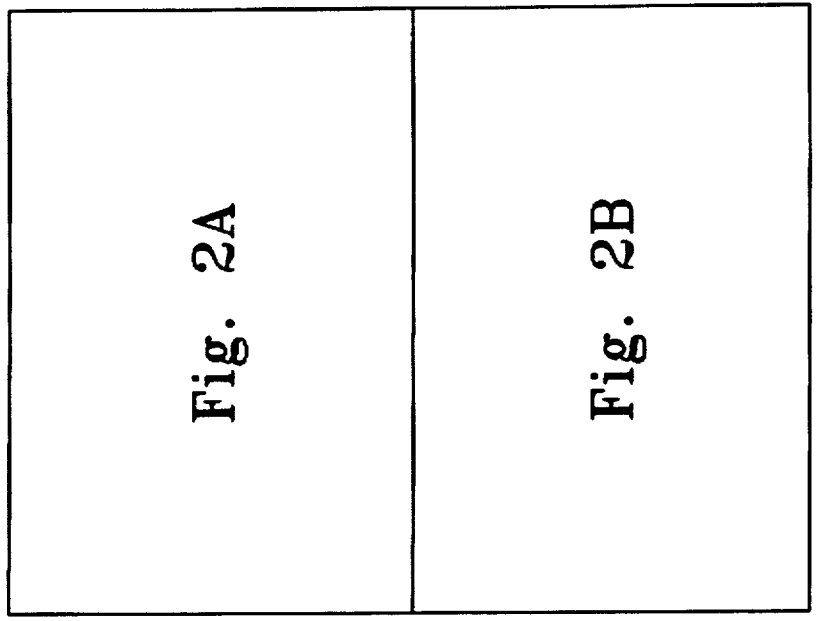
FIG. 2 (comprising FIG. 2A and FIG. 2B) is a state diagram of the Send function, including a manual "monitor dialing" mode and a manual "programed dialing" mode.
Figure 2A:
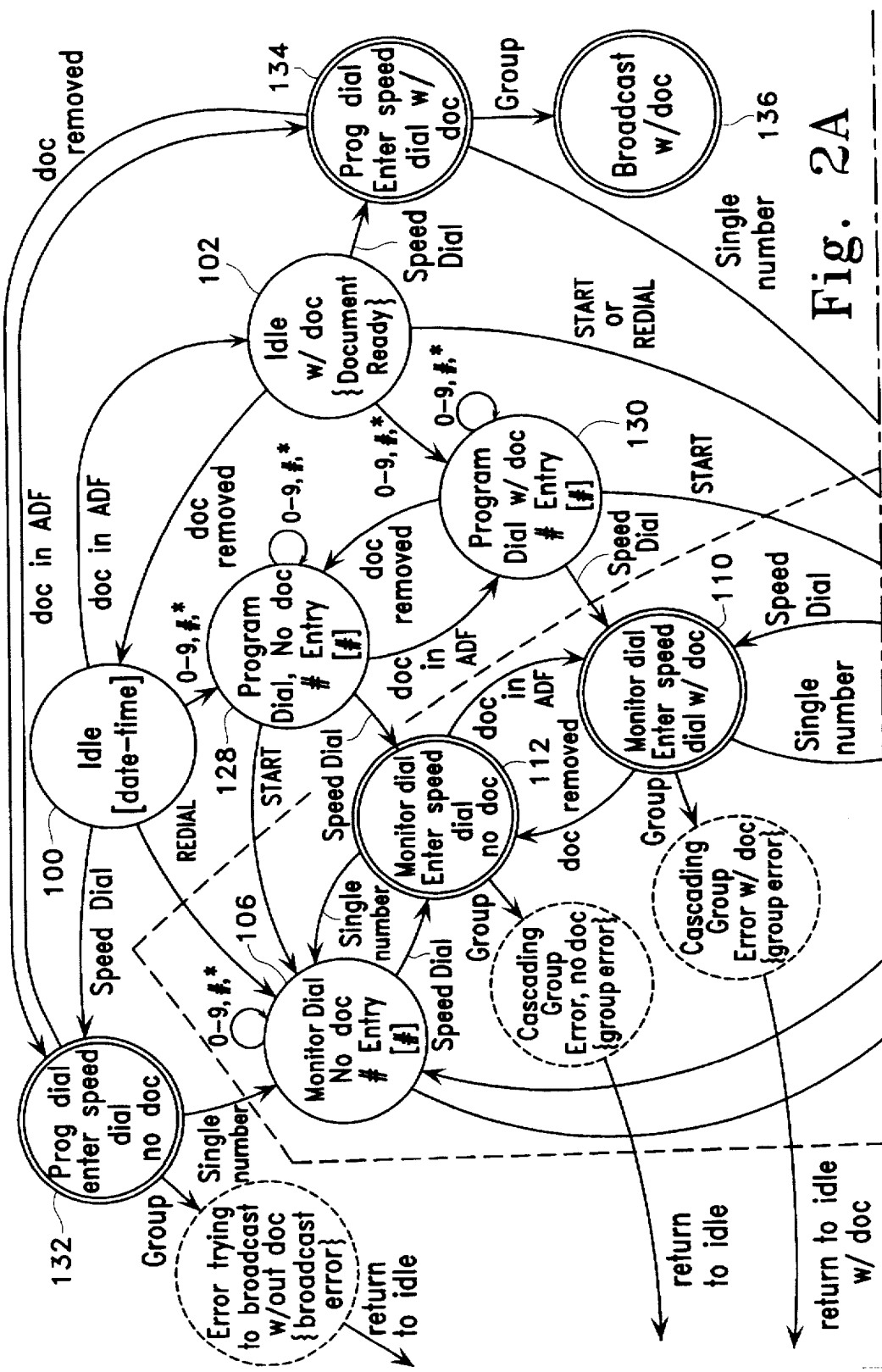
Figure 2B:
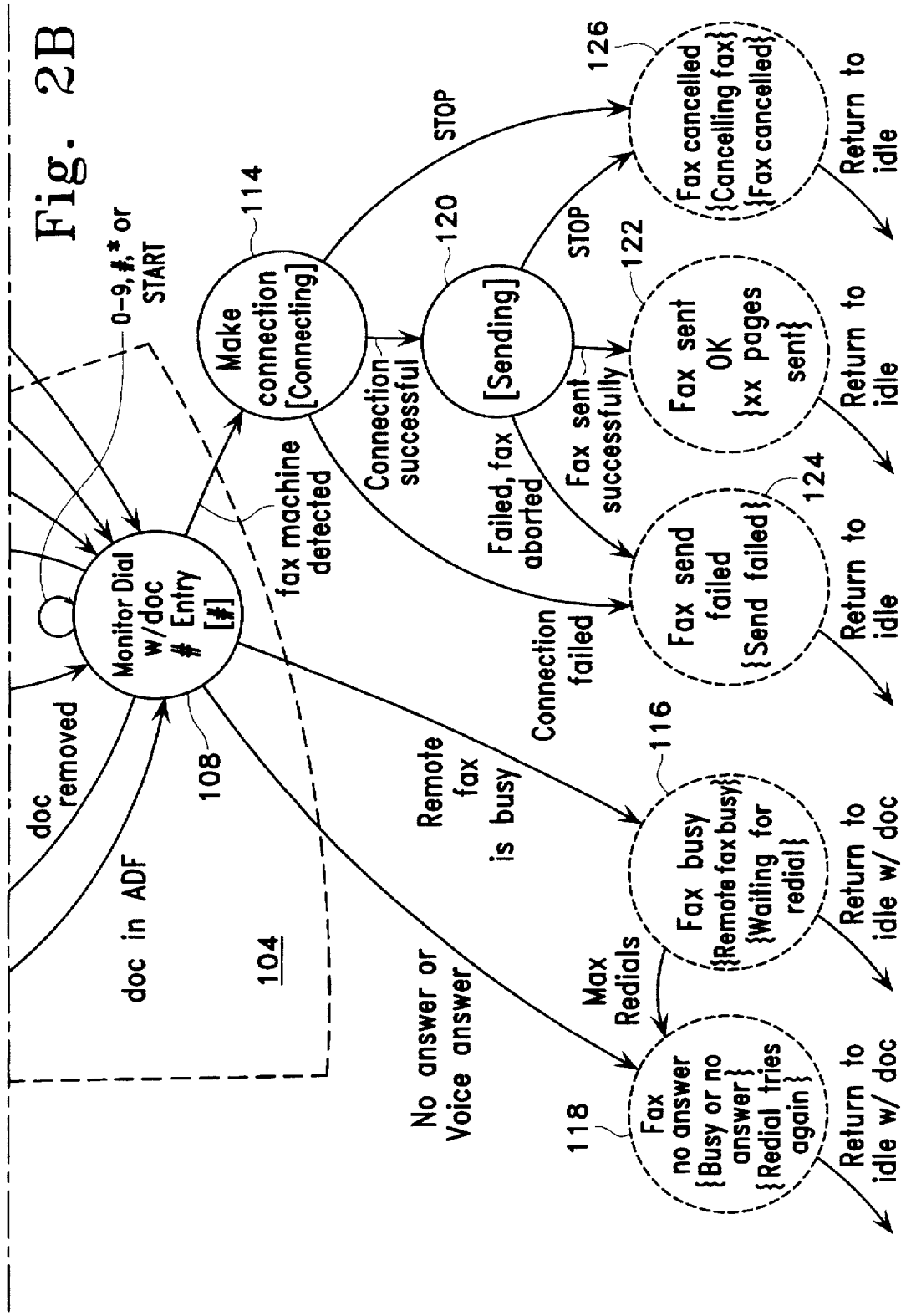

The logical relationships between the various functions involved in sending a facsimile will now be described with reference to the state diagram of FIG. 2.

In Idle mode (block 100), the date and time is displayed on display 26. When a document is inserted in the ADF ("doc in ADF" branch), control passes to Idle with Document (block 102) and a "Document Ready" message is displayed on display 26 In either case (blocks 100 or 102), the Idle process may be exited upon pressing of the "Start" button 14 (or "Redial" button 20) whereby control passes to a Monitor Dial mode inside dashed area block 104 comprising regular Monitor Dial blocks 106, 108 and Speed Dial/Monitor Dial blocks 110, 112.

Once in Monitor mode the facsimile goes off-hook and provides the user with the audible feedback from the local or remote exchange. The user may continue to enter symbolic keys ("0–9,#,*") from the keypad 18 (regular Monitor Dial blocks 106, 108) and/or use the Speed Dial button 32 (Speed Dial blocks 112, 110) to manually chain one or more previously stored speed dial entries, until a document is in the ADF (block 108) and the remote facsimile machine is detected (block 114) or an automatic redial condition is detected (block 116) or the call is answered but not by a fax machine (block 118). In the event the remote fax is detected (block 114), the transmission proceeds in conventional fashion (block 120) with the user being notified as to how many pages were sent (block 122) or of any error condition (block 124) or cancel condition (block 126).

Alternatively, if one of the numeric or symbolic keys ("0–9,#,*") of the keypad 18 is pressed during the Idle mode (blocks 100 or 102), control does not pass directly to the Monitor mode (region 104), but rather passes to a Program Dial mode (blocks 128, 130), or if the "Speed Dial" button 32 is pressed control passes to a Prog Dial/Speed Dial subroutine (blocks 132, 134).

If the Start button 14 is pressed a second time and control is already in the Monitor Dial mode (region 104), the second instance of the Start key is normally ignored and is effective only to accept a Speed Dial entry, as will be described in more detail hereinafter with reference to FIG. 3.

Once in the Program Dial mode (blocks 128,130) the system remains in Program Dial mode until either the "Start" button 14 is pressed (whereupon control passes to the corresponding Monitor Dial mode state 106, 108) or the "Speed Dial" button 32 is pressed (whereupon control passes to the corresponding Monitor Dial/Speed Dial routine via blocks 110 or 112).

In either Prog Dial/Speed Dial subroutine (blocks 132 or 134), the user may select a 1 or 2 digit speed dial location which corresponds either to a single sequence of one or more digits or symbols (but not necessarily the complete dialing sequence required to connect to a particular remote fax machine) or a group identifier (which designates one or more complete dialing sequences stored at other locations). If the selected speed dial location is a group designator and the document is already in the ADF, the document is sent as a conventional broadcast fax (block 136) without further user intervention. However, if the speed dial number is not a group designator, the stored number sequence is dialed and control passes to Monitor Dial mode (block 108) to permit the user to complete the already dialed sequence (taking into account any required pauses) and/or to monitor the progress of the call until the remote fax has been detected (block 114). In particular, if the Speed Dial button is pressed when still in Program mode and the stored number is not a Group entry (Single number branch from blocks 132, 134), control automatically passes to Monitor mode (dashed region 104), to thereby cause the facsimile to go off-hook and provide the user with the audible feedback from the local or remote exchange. This is true whether the stored number is a full telephone number, or only an access code for accessing a special dialing function (such as Mercury).

An attempt to manually chain a group broadcast speed dial entry after a prefix or other data has already been entered (Group branch from blocks 112, 110 or 132) is considered a broadcast error and control passes back to the respective Idle block 100, 102 since it is unlikely that the same prefix is appropriate for each call in the group and there is no assurance that the user will be available to manually complete the corresponding dialing information for subsequent calls to other members of the group. As depicted in FIG. 2, if the Speed Dial button is used to select a Group number when in Monitor mode, this is considered an error and control passes to the Idle mode (blocks 100, 102). However, in an alternate embodiment (not shown) if the Start button was used to enter the Monitor mode before any prefix had been entered (START branch from block 102 to 108), control may pass back to Programmed Dial mode and if there is a document already in the ADF, the Group broadcast could proceed normally (block 136).

Figure 3:
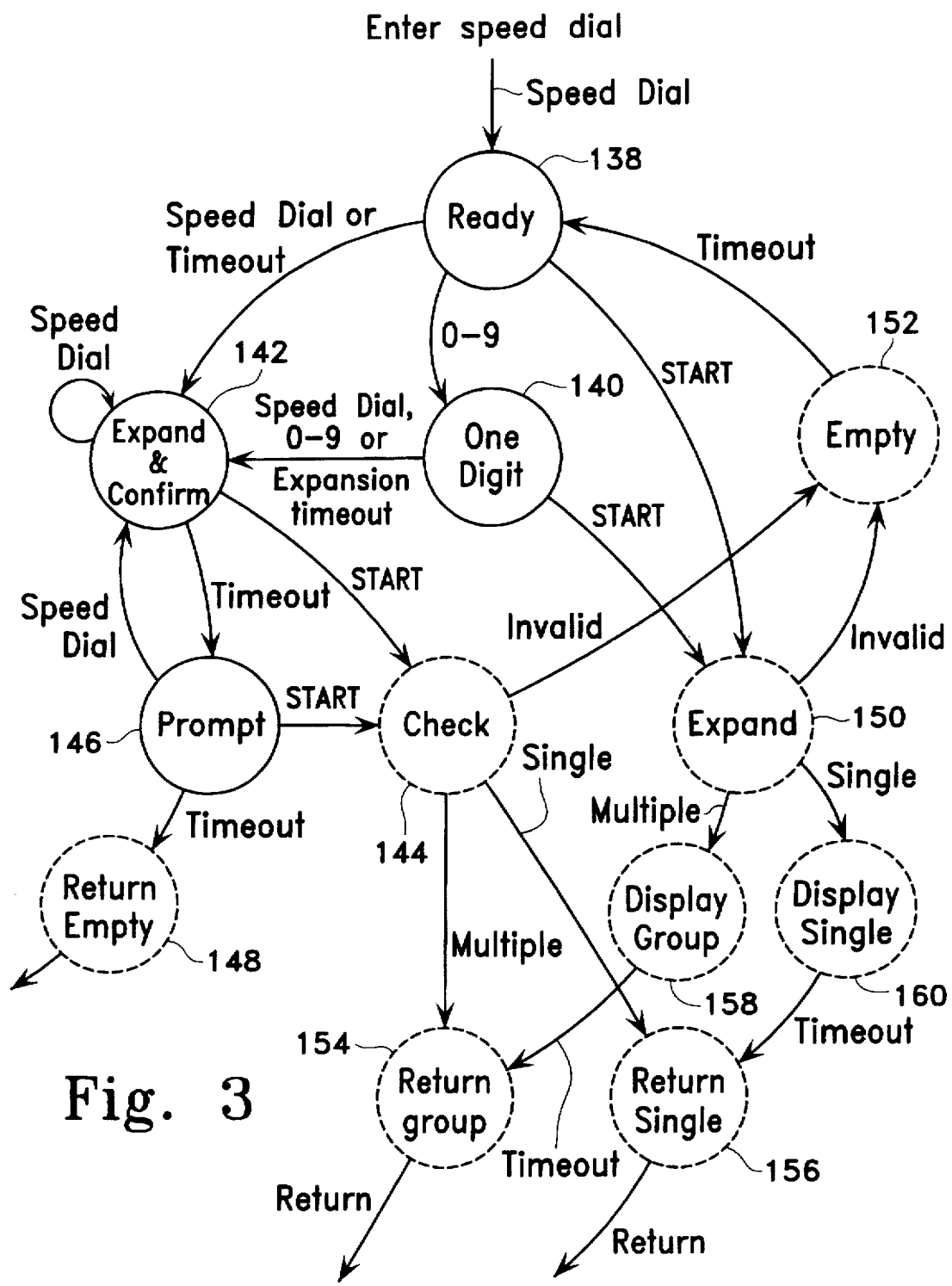
FIG. 3 is a state diagram of the Speed Dial function.

Reference should now be made to FIG. 3, which is a state diagram showing the functionality of the speed dialing button 32. In particular, once the Speed Dial button 32 is pressed, the display reads "Speed Dial [01]" (Ready block 138). In response to any of the ten numeric keys, the display changes to "Speed Dial [X]" (One Digit block 140), where X corresponds to the particular numeric key. If a second digit is entered before a predetermined timeout interval, control passes to the Confirm block 142. Alternatively, control passes directly to Confirm block 142 if the Speed Dial button 32 is pressed a second time, or the second digit timeout has occurred. The one or two digit number is used in Confirm block 142 to look up the corresponding memory location and the stored data (including both an alphanumeric ID and a numeric calling sequence) is displayed on alphanumeric display 26 for confirmation by the user. Once Confirm block 142 has been entered (for example, by pressing the second digit of a two digit number) the Speed Dial button 32 may be used to scroll through all available entries, which are successively displayed on the alphanumeric display 26. Similarly, if the Speed Dial button 32 is used to transfer control to Confirm block 142, the selected entry is scrolled before it is expanded. Assuming that the desired sequence is currently being displayed, the user confirms that the displayed sequence is correct by pressing the Start button 14 which causes a control to pass to Check block 144 for further processing. A Prompt-to-Send timeout causes control to pass to Prompt block 146, wherein the user is reminded to press the Start button. If neither the Start button 14 nor the Speed Dial button 32 is pressed within an appropriate discard timeout interval, any input is discarded and the subroutine terminates (Return block 148).

It is not necessary for the user to wait for the selected speed dial number to be expanded before it is selected. In particular, if the Start button 32 is pressed when the default location ("01") is still being displayed (Ready block 138) or when only one digit is displayed (block 140), then control passes to Expand block 150.

Regardless of whether or not the speed dial information has been confirmed before the Start button was pressed (blocks 150, 144), a test is made to determine whether the selected designation exists ("Invalid" branch leading to Empty block 152), whether the selected designation corresponds to a valid group identifier ("Multiple" branch leading to Return Group block 154), or whether the selected designation corresponds to a single valid (but not necessarily complete) sequence ("Single" branch leading to Return Single block 156).

In the event the selected entry is invalid, the display is cleared and after an appropriate timeout, control returns to Ready block 138. In the event that the selected entry was not expanded and confirmed (block 142) before the Start button was pressed, the relevant data is expanded (block 150) and displayed (blocks 158 or 160) for a timeout sufficiently long for the user to abort the process by pressing the Stop button 16 before the data corresponding to a single dialing sequence (block 156) or to a group of dialing sequences (block 154) is returned to the Send routine of FIG. 1.

In summary, the present invention is superior to the known prior art in the following respects:

Usability is improved by allowing all new users to successfully dial and send a fax by pressing buttons in the same order as they have previously on whatever fax machine they have been using, regardless of whether their previous fax experience is with a fax designed with programed dialing or one using one of the more common forms of monitor dialing.

The user may initiate a call using programed dialing and easily switch to monitor dialing to complete the dialing of the call.

The speed dial function is compatible with both monitor dialing and programed dialing.

The user can dial a call by accessing multiple dialing strings from the preprogramed memory (speed dialing) and interleaving these with any number of digits dialed from the numeric keypad, thereby permitting known and future additional special dialing functions (such as Mercury, or disable call-waiting, or enable caller ID) to be conveniently programed and accessed via the speed dial function, without any changes to the front panel or the associated software.

What is claimed is:

1. A method of operating a facsimile machine having a start button, at least one speed dial button, and a dialer keypad comprising a plurality of symbolic buttons, wherein said method comprises:

determining when the start button has been pressed;

determining whether the speed dial button has been pressed;

determining whether each of the symbolic buttons has been pressed;

if the facsimile machine is not already off-hook when the user sequentially activates one or more symbolic buttons not including the speed dial button which collectively represent a manually input dialing sequence, appending that manually input sequence to a dialing queue if the facsimile machine is not already off-hook when the user sequentially activates one or more buttons including the speed dial button which collectively represent a preprogramed dialing sequence, appending that preprogramed sequence to the dialing queue;

if the facsimile machine is not already off-hook when the user activates the start button, causing the facsimile machine to go off hook and to then generate a sequence of signals corresponding to any numbers already in the dialing queue;

if the facsimile machine is already off-hook when the user inputs a symbolic button representing a single symbol of a manually input dialing sequence, generating a signal corresponding to that manually input symbol;

if the facsimile machine is already off-hook when the user has finished sequentially activating one or more buttons including the speed dial button which collectively represent a preprogramed dialing sequence, generating a sequence of one or more signals corresponding to that preprogramed sequence;

whereby programed dialing sequences may be chained with manually input dialing sequences, the operation of the machine will be transparent to a user used to transmitting a facsimile in a programed mode wherein the number of the receiving machine is input before the machine goes off-hook, and the operation of the machine will also be transparent to a user used to transmitting a facsimile in a monitor mode wherein the number of the receiving machine is dialed interactively after the machine goes off-hook.

2. The method of claim 1, wherein the facsimile machine is connected to a personal computer and the preprogramed sequence is input remotely from a personal computer.

3. The method of claim 1, wherein the signals are DTMF tones.

4. The method of claim 1, wherein the preprogramed sequence represents a special dialing service.

5. The method of claim 1, wherein the preprogramed sequences comprise:

a default sequence selected by activating the speed dial button followed by the start button before any of the symbolic button is activated, single digit sequences selected by activating the speed dial button followed by only one of the symbolic buttons followed by the start dial button, and double digit sequences selected by activating the speed dial button followed by two of the symbolic buttons followed by the start button.

6. The method of claim 5, wherein at least the double digit sequences are displayed in expanded form before they may be selected by activating the start button.

7. The method of claim 6, wherein the default and single digit sequences are displayed in expanded form if a predetermined timeout has elapsed before the start button is activated.

8. The method of claim 5, wherein if the start button is not activated by the user with a predetermined timeout has elapsed after a particular preprogramed dialing sequence has been displayed in expanded form, that preprogramed dialing sequence is ignored.

9. The method of claim 5, wherein once a particular preprogramed dialing sequence has been displayed in expanded form, subsequent activation of the speed dial button scrolls through successive preprogramed dialing sequences.

10. The method of claim 1, wherein one or more preprogramed sequences and one or more manually input sequences may be chained together manually both before and after the machine is off-hook.

* * * * *